US010565772B2

(12) United States Patent
Howson et al.

(10) Patent No.: US 10,565,772 B2
(45) Date of Patent: Feb. 18, 2020

(54) GRAPHICS PROCESSING UNITS AND METHODS FOR CONTROLLING RENDERING COMPLEXITY USING COST INDICATIONS FOR SETS OF TILES OF A RENDERING SPACE

(71) Applicant: Imagination Technologies Limited, Kings Langley (GB)

(72) Inventors: John W. Howson, Kings Langley (GB); Richard Broadhurst, Kings Langley (GB); Steven Fishwick, Kings Langley (GB)

(73) Assignee: Imagination Technologies Limited, Kings Langley (GB)

( * ) Notice: Subject to any disclaimer, the term of this patent is extended or adjusted under 35 U.S.C. 154(b) by 11 days.

(21) Appl. No.: 15/868,556

(22) Filed: Jan. 11, 2018

(65) Prior Publication Data

US 2018/0197323 A1 Jul. 12, 2018

(30) Foreign Application Priority Data

Jan. 12, 2017 (GB) .................................. 1700565.3

(51) Int. Cl.
*G06T 15/00* (2011.01)
*G06T 17/10* (2006.01)
(Continued)

(52) U.S. Cl.
CPC ............ *G06T 15/005* (2013.01); *G06T 15/04* (2013.01); *G06T 15/06* (2013.01); *G06T 15/40* (2013.01);
(Continued)

(58) Field of Classification Search
None
See application file for complete search history.

(56) References Cited

U.S. PATENT DOCUMENTS

2006/0170703 A1* 8/2006 Liao .......................... G06T 9/00
345/613
2013/0135322 A1 5/2013 Seetharamaiah et al.
(Continued)

FOREIGN PATENT DOCUMENTS

GB 2481099 A 12/2011
GB 2509822 A 7/2014
(Continued)

OTHER PUBLICATIONS

Vaidyanathan et al.; "Coarse Pixel Shading"; High Performance Graphics; Jan. 1, 2014; pp. 1-10.

*Primary Examiner* — Nurun N Flora
(74) *Attorney, Agent, or Firm* — Potomac Law Group, PLLC; Vincent M DeLuca

(57) ABSTRACT

A graphics processing unit (GPU) processes graphics data using a rendering space which is sub-divided into a plurality of tiles. The GPU comprises cost indication logic configured to obtain a cost indication for each of a plurality of sets of one or more tiles of the rendering space. The cost indication for a set of tile(s) is suggestive of a cost of processing the set of one or more tiles. The GPU controls a rendering complexity with which primitives are rendered in tiles based on the cost indication for those tiles. This allows tiles to be rendered in a manner that is suitable based on the complexity of the graphics data within the tiles. In turn, this allows the rendering to satisfy constraints such as timing constraints even when the complexity of different tiles may vary significantly within an image.

20 Claims, 7 Drawing Sheets

(51) Int. Cl.
  *G06T 15/40*   (2011.01)
  *G06T 15/04*   (2011.01)
  *G06T 15/06*   (2011.01)
  *G06T 15/80*   (2011.01)

(52) U.S. Cl.
  CPC .............. *G06T 15/80* (2013.01); *G06T 17/10* (2013.01); *G06T 2200/28* (2013.01)

(56) References Cited

U.S. PATENT DOCUMENTS

| | | |
|---|---|---|
| 2013/0142428 A1 | 6/2013 | Pallister |
| 2013/0307847 A1 | 11/2013 | Dey et al. |
| 2013/0335429 A1 | 12/2013 | Barringer et al. |
| 2014/0139534 A1* | 5/2014 | Tapply .................. G06T 15/005 345/522 |
| 2014/0354682 A1 | 12/2014 | Heggelund et al. |
| 2015/0194136 A1* | 7/2015 | Diard .................. G06F 9/45533 345/547 |

FOREIGN PATENT DOCUMENTS

| | | |
|---|---|---|
| WO | 2006/122212 A2 | 11/2006 |
| WO | 2013/130030 A1 | 9/2013 |
| WO | 2016/000129 A1 | 1/2016 |

* cited by examiner

GRAPHICS PROCESSING UNITS AND METHODS FOR CONTROLLING RENDERING COMPLEXITY USING COST INDICATIONS FOR SETS OF TILES OF A RENDERING SPACE

BACKGROUND

Graphics processing systems are typically configured to receive graphics data, e.g. from an application running on a computer system, and to render the graphics data to provide a rendering output. For example, the graphics data provided to a graphics processing system may describe geometry within a three dimensional (3D) scene to be rendered, and the rendering output may be a rendered image of the scene. Some graphics processing systems (which may be referred to as "tile-based" graphics processing systems) use a rendering space which is subdivided into a plurality of tiles. The "tiles" are regions of the rendering space, and may have any suitable shape, but are typically rectangular (where the term "rectangular" includes square). To give some examples, a tile may cover a 16×16 block of pixels or a 32×32 block of pixels of an image to be rendered. As is known in the art, there are many benefits to subdividing the rendering space into tiles. For example, subdividing the rendering space into tiles allows an image to be rendered in a tile-by-tile manner, wherein graphics data for a tile can be temporarily stored "on-chip" during the rendering of the tile.

Tile-based graphics processing systems typically operate in two phases: a geometry processing phase and a rendering phase. In the geometry processing phase, the graphics data for a render is analysed to determine, for each of the tiles, which graphics data items are present within that tile. Then in the rendering phase, a tile can be rendered by processing those graphics data items which are determined to be present within that tile (without needing to process graphics data items which were determined in the geometry processing phase to not be present within the particular tile). The graphics data items may represent geometric shapes, which describe surfaces of structures in the scene, and which are referred to as "primitives". A common primitive shape is a triangle, but primitives may be other 2D shapes or may be lines or points also. Objects can be composed of one or more (e.g. hundreds, thousands or millions) of such primitives.

Rendered images may be displayed on a display. A display may refresh pixels in a raster scan order, such that the upper rows of pixels of an image are displayed before lower rows of pixels of the image. In some situations, images may be rendered and displayed in real-time. Latency between rendering an image and displaying the image may detrimentally affect a user's perception of an application (e.g. a game application), in particular if the user interacts with the application. This is a particular issue for virtual reality applications. In order to reduce latency, a tile-based rendering system can render tiles in a raster scan order ahead of the raster scan of the display. This may allow some tiles of an image (e.g. corresponding to upper rows of an image) to be rendered and displayed before other tiles of the image (e.g. corresponding to lower rows of an image) have even been rendered. This can reduce the latency within the rendering/display chain.

As the rendering of a row of tiles must always proceed ahead of the display of the corresponding scan lines, this approach introduces a strict real-time timing requirement on the rendering of tiles.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In examples described herein a graphics processing unit is configured to process graphics data using a rendering space which is sub-divided into a plurality of tiles. The graphics processing unit comprises cost indication logic configured to obtain a cost indication for each of a plurality of sets of one or more tiles of the rendering space, wherein the cost indication for a set of one or more tiles is suggestive of a cost of processing the set of one or more tiles. The graphics processing unit is configured to control a rendering complexity with which primitives are rendered in tiles based on the cost indication for those tiles. This allows tiles to be rendered in a manner that is suitable based on the complexity of the graphics data within the tiles. In turn, this allows the rendering to satisfy constraints such as timing constraints even when the complexity of different tiles may vary significantly within an image. For example, there may be a timing constraint that a row of tiles must be rendered in time to be displayed ahead of the raster scan of the display, and the cost indications for the tiles in a row may provide an indication of a likely rendering time for rendering those tiles. If the likely rendering time does not meet the timing constraint then the rendering complexity may be reduced for at least some of the tiles in the row to thereby reduce the rendering time for the row, and thereby meet the timing constraint. As an example, a rendering complexity may be controlled by controlling the number of samples per pixel which are processed in order to render primitives in a tile. In another example, where render timing is less important than image quality, the rendering complexity (e.g. number of samples per pixel) may be increased for tiles with higher cost indications because these tiles may include greater image detail and therefore may benefit from being rendered with greater precision compared to tiles with lower cost indications.

In particular, there is provided a graphics processing unit configured to process graphics data using a rendering space which is sub-divided into a plurality of tiles, the graphics processing unit comprising: cost indication logic configured to obtain a cost indication for each of a plurality of sets of one or more tiles of the rendering space, wherein the cost indication for a set of one or more tiles is suggestive of a cost of rendering the set of one or more tiles; and rendering logic configured to render primitives in the tiles of the rendering space; wherein the graphics processing unit is configured to control a rendering complexity with which the rendering logic renders primitives in the sets of one or more tiles in dependence on the cost indications for the sets of one or more tiles.

There is provided a method of processing graphics data in a graphics processing system using a rendering space which is sub-divided into a plurality of tiles, the method comprising: obtaining a cost indication for each of a plurality of sets of one or more tiles of the rendering space, wherein the cost indication for a set of one or more tiles is suggestive of a cost of rendering the set of one or more tiles; rendering primitives in the tiles of the rendering space; and controlling a rendering complexity with which the primitives in the sets of one or more tiles are rendered in dependence on the cost indications for the sets of one or more tiles.

In some examples, the rendering complexity is controlled such that the rendering of the tiles satisfies one or more rendering constraints, such as the timing at which rows of tiles are rendered. This is particularly useful if the tiles are being rendered in a raster scan order ahead of the raster scan of a display, since it allows the tiles to be rendered in time to be displayed in real-time, at reduced latency.

The cost indication logic may be implemented as part of geometry processing logic which also comprises a tiling unit. By including the cost indication logic in the geometry processing logic, the costs can be determined for sets of one or more tiles of an image before the rendering of the tiles is performed in the rendering logic. The tiling unit may be configured to generate control streams for the tiles of the rendering space indicating which primitives are present in the tiles, and wherein the rendering logic is configured to identify which primitives are present in a tile using the control stream for the tile. The tiling unit may be configured to include the cost indications in the control streams for the tiles.

In examples described herein, the rendering complexity with which the rendering logic renders primitives in a particular set of one or more tiles is controlled in dependence on the respective cost indication for the particular set of one or more tiles.

The graphics processing unit may be configured to control the rendering complexity by controlling a number of samples per pixel that are processed by the rendering logic. In some examples, if the number of samples per pixel is controlled to be fewer than one sample per pixel then for some pixels a sample is not rendered, and the graphics processing unit is configured to determine values for the unrendered pixels by combining nearby rendered pixel values. The graphics processing unit may be configured to select the unrendered pixels to be evenly spatially-distributed.

In some examples, the rendering logic comprises a hidden surface removal unit and a texturing/shading unit, and the graphics processing unit may be configured to control the rendering complexity by controlling a number of samples per pixel that are processed by the hidden surface removal unit and independently controlling a number of samples per pixel that are processed by the texturing/shading unit.

The graphics processing unit may be configured to control the rendering complexity by controlling one or more rendering processes that are applied by the rendering logic to primitive fragments at sample positions within the rendering space. Said controlling rendering processes may comprise one or more of: controlling filtering operations applied to primitive fragments; controlling ray tracing parameters including one or more of a number of ray bounces to be processed and a clipping distance for rays, when the rendering logic is configured to apply a ray tracing technique; and controlling shading effects which are applied to primitive fragments.

The graphics processing unit may be configured to control the rendering complexity by controlling the number of colour values that are determined per sample. For example, at full rendering complexity, the rendering logic may be configured to generate a set of colour values for each rendered sample; and at a reduced rendering complexity, the rendering logic may be configured to generate a subset of the set of colour values for one or more rendered samples.

The graphics processing unit may be configured to control the rendering complexity with which the rendering logic renders primitives in the sets of one or more tiles in dependence on the cost indications for the sets of one or more tiles in order to satisfy one or more rendering constraints. The one or more rendering constraints may include one or more of: a constraint on the timing at which respective portions of a rendered image are output from the rendering logic; and a constraint on the timing at which a rendered image is output from the rendering logic. The one or more rendering constraints may include a target frame rate at which images are rendered by the rendering logic, and the graphics processing unit may be configured to control the rendering complexity in dependence on the cost indications such that the rendering logic renders images at a rate that satisfies the target frame rate. The one or more rendering constraints may include a timing constraint for rendering a line of tiles at the rendering logic, and the graphics processing unit may be configured to control the rendering complexity in dependence on the cost indications such that the rendering logic renders lines of tiles at a rate that satisfies the timing constraint. The one or more rendering constraints may include a target quality for rendering tiles at the rendering logic, and the graphics processing unit may be configured to control the rendering complexity in dependence on the cost indications such that the rendering logic renders tiles to satisfy the target quality.

The graphics processing unit may further comprise control logic configured to control the rendering complexity.

The rendering logic may be configured to render tiles in an order such that lines of tiles are rendered to be output in real-time to a display in a raster scan order. Furthermore, the graphics processing unit may comprise a frame buffer configured to store rendered image values which have been rendered by the rendering logic, wherein the frame buffer may be configured to output some lines of rendered image values of an image for display in a raster scan order before other lines of rendered image values of the image have been rendered by the rendering logic.

The graphics processing unit may be embodied in a device which further comprises a display, wherein rendered image values representing pixels of a rendered image are to be sent to the display for display thereon.

The graphics processing unit may be embodied in a device which further comprises a transmission unit, wherein rendered image values representing pixels of a rendered image are to be provided to the transmission unit for transmission to a display for display thereon.

The graphics processing unit may be embodied in a device which further comprises a video encoding unit configured to encode rendered image values rendered by the rendering logic.

The cost indication for a set of one or more tiles may be based on one or more factors which influence a cost of rendering the set of one or more tiles. For example, the cost indication logic may be configured to determine the cost indications for the sets of one or more tiles of the rendering space, e.g. by combining scores associated with primitives which are present in the tile, wherein the score associated with a primitive may be dependent upon an object type of an object of which the primitive is a part. To give some further examples, the cost indication logic may be configured to determine a cost indication for a tile of the rendering space based on one or more of the following factors: (i) a number of primitives in the tile; (ii) object types associated with the primitives in the tile; (iii) tile coverage area of the primitives in the tile; (iv) characteristics of one or more shader programs which are to be executed for rendering the primitives in the tile; (v) a user input; and (vi) a processing cost of a corresponding tile in a previous render. The characteristics of a shader program may include one or more of: (i) a length of the shader program; (ii) an amount of resources or registers used by the shader program; (iii) whether the shader program includes conditional flow control; (iv) whether the shader program includes loops for which the number of repetitions is undefined at compile time; and (v) an amount of memory reads and/or writes used in the shader program. The graphics processing unit may receive, from a compiler, the characteristics of the one or more shader programs which are to be executed for rendering the primitives in the tile.

The cost indication logic may be configured to quantise the cost indications.

The graphics processing units described herein may be embodied in hardware on an integrated circuit. There may be provided a method of manufacturing, at an integrated circuit manufacturing system, a graphics processing unit as described herein. There may be provided an integrated circuit definition dataset that, when processed in an integrated circuit manufacturing system, configures the system to manufacture a graphics processing unit as described herein. There may be provided a non-transitory computer readable storage medium having stored thereon a computer readable description of an integrated circuit that, when processed, causes a layout processing system to generate a circuit layout description used in an integrated circuit manufacturing system to manufacture a graphics processing unit as described herein.

There may be provided an integrated circuit manufacturing system comprising:
 a non-transitory computer readable storage medium having stored thereon a computer readable integrated circuit description that describes a graphics processing unit as described herein;
 a layout processing system configured to process the integrated circuit description so as to generate a circuit layout description of an integrated circuit embodying the graphics processing unit; and
 an integrated circuit generation system configured to manufacture the graphics processing unit according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
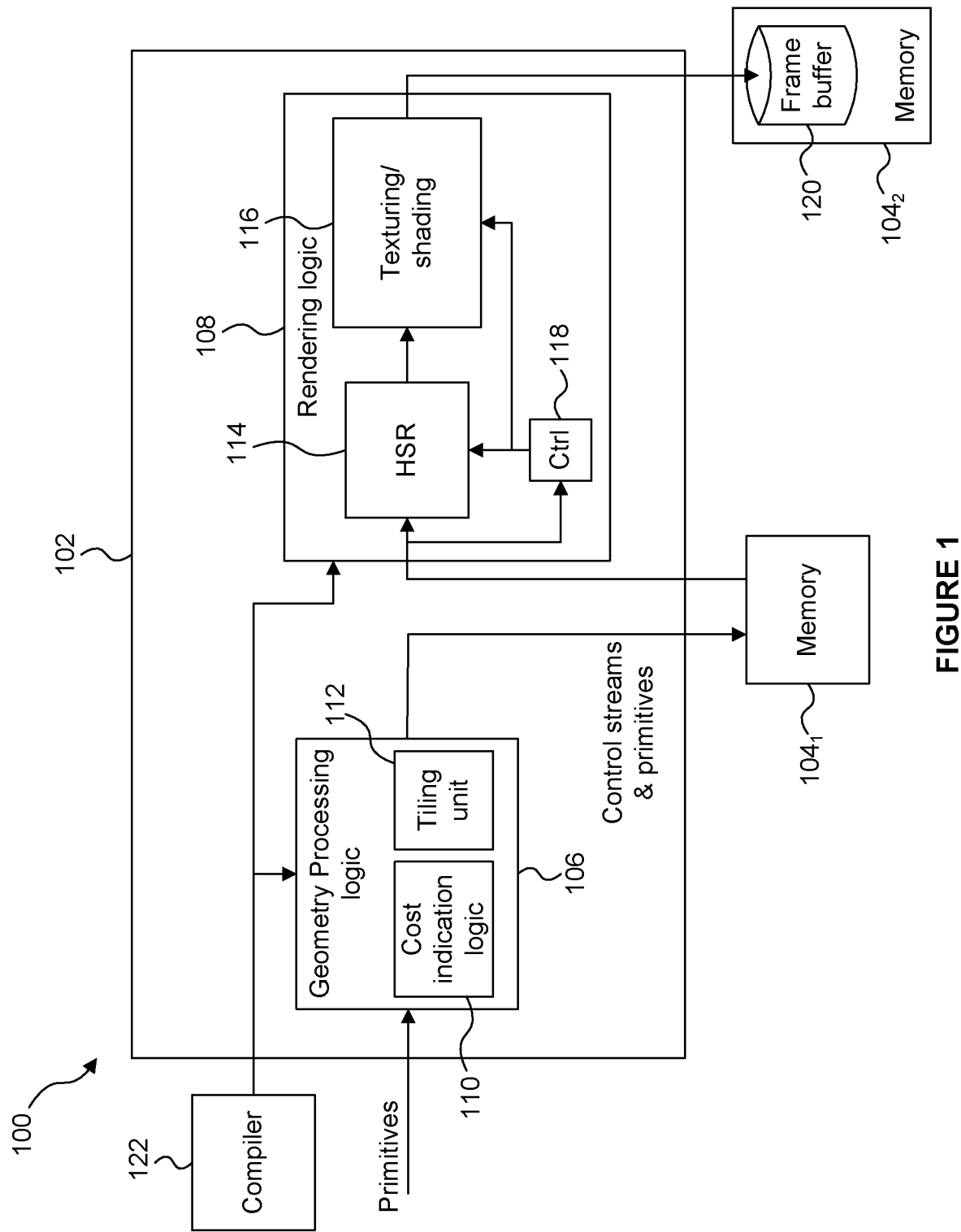
FIG. 1 shows a graphics processing system.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

FIG. 1 shows some elements of a graphics processing system 100 which may be used to render an image of a 3D scene. An "image" may also be referred to as a "frame" herein. The graphics processing system 100 comprises a graphics processing unit (GPU) 102 and two portions of memory $104_1$ and $104_2$. The two portions of memory $104_1$ and $104_2$ may, or may not, be parts of the same physical memory. The memory $104_2$ is configured to include a frame buffer 120. The GPU 102 comprises geometry processing logic 106 and rendering logic 108. The geometry processing logic 106 comprises cost indication logic 110 and a tiling unit 112. The geometry processing logic 106 is configured to implement a geometry processing phase of the graphics rendering process and as such may include further elements to those shown in FIG. 1 such as a transformation unit and a clipping/culling unit, as would be apparent to a person skilled in the art. The rendering logic 108 comprises a hidden surface removal (HSR) unit 114 configured to perform hidden surface removal on primitive fragments for removing primitive fragments which are hidden by other primitive fragments, a texturing/shading unit 116 configured to perform texturing and/or shading on graphics data (e.g. primitive fragments) for tiles of the rendering space, and control logic configured to control the rendering complexity with which primitives are rendered, as described in more detail below. The graphics processing system 100 also comprises a compiler 122 configured to compile programs (e.g. shader programs) to be executed on the GPU 102. The rendering logic may be configured to implement any suitable rendering technique, such as rasterisation or ray tracing to perform the rendering.

Figure 2:
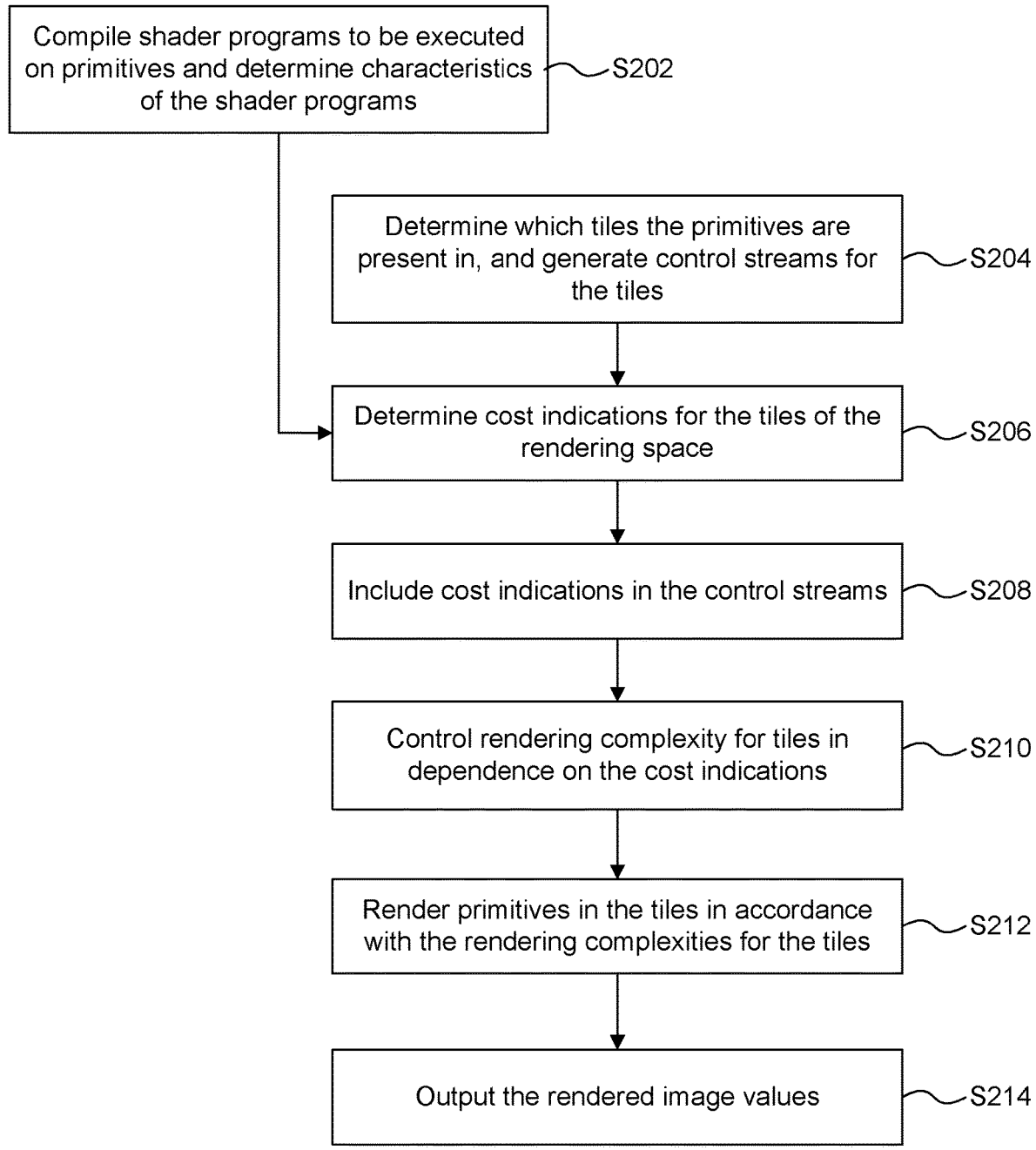
FIG. 2 is a flow chart for a method of processing graphics data using the graphics processing system.

Graphics data for performing a render is received at the GPU 102, e.g. from a game application running on a CPU in the same computing system as the GPU 102. The graphics data may include primitive data describing primitives of objects in a scene to be rendered. The graphics data may also specify one or more shader programs which are to be executed on the primitive data for rendering the primitives. An example operation of the graphics processing system 100 is described with reference to the flow chart shown in FIG. 2.

In step S202 the compiler 122 compiles the shader programs which are associated with the primitives and determines characteristics of the shader programs. It is noted that shader programs used to determine position (e.g. vertex and geometry shaders) are executed on primitives; whereas shaders specifying how an image will be rendered (e.g. pixel shaders) are executed on primitive fragments corresponding to parts of primitives that cover pixels (or more precisely that cover sample positions). The characteristics which are determined include characteristics which are indicative of the complexity of the shader program. In particular, the characteristics are determined so as to give an indication of a cost of processing primitives using the particular shader programs. For example, the length of the shader program (e.g. number of operations to be performed) may be identified. The "length" of the shader program may refer to the length of execution (e.g. including loops where the number of executions is known in advance) of the shader program, rather than the amount of code. Furthermore, shader programs are identified as being potentially high cost if they contain loops that execute for a variable number of times, where that variable number is determined at runtime, i.e. it is not a known number at compilation time. Loops such as this are potentially very costly to execute if they loop a large number of times in runtime. As another example, the compiler could determine an amount of resources, memory reads/writes or registers used by the shader program, and use this as a measure of the processing cost associated with running the shader program. It is noted that a shader which does lots of reading and/or writing from memory (e.g. sampling from textures), which may be external memory, will likely take significantly longer to process than one that primarily consists of arithmetic instructions. Other characteristics which may be determined include whether the shader program includes conditional flow control.

Step S202 may be performed prior to runtime, i.e. in an offline process. For example, the shader programs may be compiled when the application loads. In particular, the shader programs may be compiled before the rendering begins (e.g. before the tiling phase begins) and before the shaders are associated with any specific geometry. However, in other examples it would be possible for a shader program to be compiled during runtime before the main rendering begins, e.g. in response to determining that a primitive is to be processed using the shader program. The compiler 122 can flag a large number of potentially expensive things that may be present in a shader program. The compiler 122 is arranged to provide the determined characteristics of the shader programs to the tiling unit 112. The compiler 122 is arranged to provide the compiled shader programs to the rendering logic 108 to be executed by the texturing/shading unit 116 for processing primitives.

A sequence of primitives provided by an application may be received at the geometry processing logic 106. In a geometry processing phase, the geometry processing logic 106 performs functions such as clipping and culling to remove primitives which do not fall into a visible view, and projection of primitives into screen-space, and tiling of primitives as described below.

In step S204 the tiling unit 112 determines which primitives are present within each of the tiles of the rendering space of the graphics processing system 100.

The tiling unit 112 assigns primitives to tiles of the rendering space by creating control streams for the tiles, wherein the control stream for a tile includes indications of primitives which are present within the tile. The control streams and the primitives are outputted from the tiling unit 112 and stored in the memory $104_1$. The geometry processing phase (performed by the geometry processing logic 106) takes account of primitives across the whole of an image, i.e. for all of the tiles in the image. Then in the rendering phase, the rendering logic 108 renders tiles of the image and stores the outputs for rendered tiles in appropriate portions of the frame buffer 120. When all of the tiles of an image have been rendered, the frame buffer 120 stores the rendered results (e.g. pixel values) for the whole image. In examples described herein, the opportunity that is provided in the geometry processing phase to assess all of the data for an image before tiles are rendered for the image is used to determine information about the image which may be useful for controlling the rendering phase. In examples described below, the rendering complexity with which the rendering logic 108 renders different tiles can be controlled in accordance with an estimated rendering time for the tiles, e.g. such that the tiles can be rendered to meet a timing constraint.

In step S206 the cost indication logic 110 determines cost indications for the tiles of the rendering space. As described above, the cost indication for a tile suggests a cost of processing (e.g. rendering) the tile. The cost indication logic 110 may determine the cost indications based, at least in part, on the determined characteristics of the shader programs that were determined by the compiler 122 in step S202. For example, the cost indication for a tile may be based, at least in part, on the determined characteristics of the shader programs associated with the primitives that are included in the tile. Furthermore, in general as described below, cost indications may be determined for sets of one or more tiles, i.e. a cost indication may be determined for a tile and/or a cost indication may be determined for a set of tiles. For simplicity some of the explanation herein refers to there being a cost indication for a tile, but in general it is to be understood that this explanation could be extended to having a cost indication for a set of tiles (i.e. a set including a plurality of tiles). In this description, a high cost indication corresponds to a high processing cost, and a low cost indication corresponds to a low processing cost. In some examples, the cost indication for a set of one or more tiles is indicative of one or more factors which influence a cost of processing the set of one or more tiles.

The cost indications may take different forms in different examples. In some examples, the cost indication for a tile may be an estimate of a processing cost that will be incurred when the tile is processed by the rendering logic 108. As described above, a processing cost could be a length of processing time, a number of computation operations performed, a processing power consumed, a number of reads/writes from/to memory, or any other suitable measure of the cost of processing a tile. However, in some examples, the cost indication for a tile might not be a direct estimate of a processing cost. The cost indication for a set of one or more tiles may be based on the content of the set of one or more tiles. The cost indication for a set of one or more tiles may be based on one or more factors which influence a cost of processing the set of one or more tiles. For example, a cost indication could be a number of primitives which are present in a tile. The number of primitives in a tile is not a direct estimate of the cost of processing the tile, but it is indicative of an approximate processing cost that is likely to be involved in processing a tile. For example, a larger number of primitives in a tile may suggest that the tile will incur a greater processing cost. In a broad sense, the cost indication for a tile could be any parameter which is suggestive of a cost of processing the tile, i.e. a parameter which provides some measure of likely processing cost for use in distinguishing between tiles. It is further noted that the cost indications might not always accurately reflect the true processing costs of processing tiles, but they aim to provide a better indication of processing costs for tiles than if no cost indications were determined at all.

In a simple example, the cost indication for a tile is the number of primitives which are present in the tile. A tile which overlaps with a relatively large number of primitives tends to incur a greater processing cost than a tile with a relatively small number of primitives, so the number of primitives in a tile is a useful cost indication even if it does not always reflect the exact actual processing cost of rendering the tile. Furthermore, the number of primitives in a tile is very simple to calculate in the tiling unit 112 because it can be directly observed from the control stream for the tile, i.e. the number of primitive identifiers included in the control stream for a tile at the end of the tiling phase indicates the number of primitives in that tile. So in this example, the cost indication logic 110 does not add significant complexity to the geometry processing logic 106.

In a slightly more complex example, the cost indication logic 110 determines the cost indication for a tile by combining scores associated with primitives which are present in tile. The score associated with a primitive may be dependent upon an object type of an object of which the primitives is a part. For example, primitives associated with an opaque object type may be relatively simple to process in the rendering logic 108, so these primitives may be associated with low scores; whereas primitives associated with other object types, e.g. translucent or punch through object types or object types allowing primitives to change their depths during rendering, may be relatively complex to process in the rendering logic 108, so these primitives may be associated with high scores. In particular, the rendering of these more complex object types (e.g. translucency and punch through and types allowing objects to change depth during rendering) may utilise blending or other operations that require multiple passes in the rendering logic 108 to resolve the pixels covered by these primitives. For example, each primitive associated with an opaque object type may be given a score of one, each primitive associated with a translucent or punch through object type may be given a score of ten, and each primitive which may change depth during rendering may be given a score of eight. This reflects a likely difference in the processing costs of the different types of primitives. The scores for the primitives within a tile can be summed, or combined in another way, to provide a cost indication for the tile. In different examples, the scores for different object types may be different to those described herein.

Tessellation is a technique which allows a graphics data item (which may be referred to as a "patch") to be expanded into many primitives during rendering. In the case of tessellation, it may be the patches (rather than the expanded primitives) which are sorted into tiles in step S204. A patch may be associated with a higher cost than a standard triangular primitive which has been sorted into a tile. Tessellation can be useful for representing complex (e.g. curved) surfaces, but can result in a large number of primitives being rendered. A cost indication for a tile could be based on whether tessellation is applied to a patch to form primitives in the tile. For example, a flag could be used to indicate that a patch to be tessellated is present in a tile, which might be particularly useful if tessellation is performed on demand in the rendering logic 108. As an example, if a tile includes a patch to be tessellated, a cost indication for the tile could be higher, e.g. the cost indication for the tile could depend upon the number of triangles which result from the tessellation of the patch.

In other examples the cost indications may be determined in different ways. For example, the tile coverage area of the primitives in a tile may be considered when determining the cost indication for the tile. The tile coverage area of a primitive indicates a number of sample positions at which that primitive may be visible within the tile, and therefore provides an indication of the amount of processing that will be performed when processing the primitive in the tile in the rendering logic 108. In some examples, a user could provide a user input to guide the determination of the cost indications for the tiles. In this sense the cost indication logic 110 may receive the cost indications for the tiles via an input. For example, a user may be able to specify the cost indications for the tiles directly, e.g. via an API extension, to allow a developer to explicitly provide tile costs to ensure efficient performance using a priori knowledge of the workloads associated with particular tiles.

A driver mechanism may pass information from the compiler 122 to the tiling unit 112, and this information may include the characteristics of the shader programs determined by the compiler 122. Optionally the driver may wish to be used to flag geometry that must be regenerated (e.g. pipeline stages such as geometry shaders and tessellation shaders can be used to expand primitives to create multiple primitives), and in some graphics processing systems the expanded primitives are not stored after the geometry processing phase and must be regenerated before use in the rendering phase.

The examples described above relate to the factors relating to the processing of the current render which can be used to estimate likely processing costs for rendering different tiles of the render. As well as these factors, the cost indication logic 110 could determine the processing costs (either predicted or actual costs) for tiles of a previous render (e.g. the immediately preceding render, e.g. the preceding frame), and can use these as a factor in determining the cost indications for the tiles of the current render. Two frames of a sequence of frames are likely to be similar if they are close to each other in the sequence, e.g. if they are consecutive frames, unless there is a scene change or a sudden change in the content. Therefore, the processing costs of particular tiles in a previous frame provide a good indication of the processing costs of corresponding tiles in a current frame. The "corresponding tiles" in different frames may be tiles in the same position within the rendering space, or may be displaced relative to each other, e.g. by an amount representative of motion of content in the scene (e.g. represented by motion vectors). Furthermore, the system could learn how measured characteristics correspond to rendering time, and optimise its models for determining cost indications from the measured characteristics accordingly.

To summarise some of the examples described above, the cost indication logic 110 may determine a cost indication for a tile of the rendering space based on one or more of the following factors: (i) a number of primitives in the tile; (ii) object types associated with the primitives in the tile; (iii) tile coverage area of the primitives in the tile; (iv) characteristics of one or more shader programs which are to be executed for rendering the primitives in the tile; (v) a user input; and (vi) a processing cost of a corresponding tile in a previous render. However, it will be apparent that other factors may be used in other examples for determining the cost indications. The cost indication logic 110 may determine the cost indication for a tile based on a plurality of the factors, e.g. according to any suitable combination, which may or may not be weighted in favour of one factor over another factor.

As described above, the characteristics of a shader program may include one or more of: (i) a length of the shader program; (ii) an amount of resources or registers used by the shader program; (iii) whether the shader program includes conditional flow control; (iv) whether the shader program includes loops for which the number of repetitions is undefined at compile time; and an amount of memory reads and/or writes used in the shader program.

As described above a cost indication may be determined for each set of one or more tiles. It may be the case that each set of one or more tiles comprises the same number of tiles. In some examples the sets of one or more tiles each comprise a single tile. In other examples, the sets of one or more tiles each comprise a plurality of tiles. The sets of tiles may be blocks of tiles (e.g. contiguous tiles) of the rendering space. As a matter of terminology, this disclosure refers to "sets" of tiles meaning a group of tiles without any implicit limitation to the spatial position of the tiles in the group, whereas a "block" of tiles means a group of tiles which is spatially contiguous in the rendering space. Blocks of tiles may take any suitable size and shape. Just to give some examples, a block of tiles may be a 2×2, 3×2, 4×2 or 4×4 block of tiles.

The cost indication logic 110 may quantise the cost indications. In particular, the quantised cost indications may be quantised to be represented by a number of bits, the number of bits being in a range from 1 to 8. In an extreme example, the quantised cost indications each have a single bit, such that they act as a flag to indicate that a tile is either a high cost tile or a low cost tile. Even when the cost indications are quantised to this extent the use of the cost indications can be useful for distinguishing between high-cost tiles and low-cost tiles. Quantising the cost indications reduces the amount of data used to store the cost indications.

In step S208 the tiling unit 112 includes the determined cost indications in the control streams for the tiles to be stored in the memory $104_1$. For example the tiling unit 112 could include the determined cost indications in a tail pointer cache which includes pointers to the ends of the lists of primitive IDs for respective tiles. The pointers can be included in the tail pointer cache for the tiles of a rendering space at the end of processing the geometry for a render in the tiling unit 112, and at this point the cost indication logic 110 has determined the cost indications for the tiles, so this is a good opportunity to add the cost indications in a suitable place in the control streams without having to significantly alter the operation of the tiling unit 112. At the end of the geometry processing phase the control streams for the tiles (including the cost indications) are stored in the memory $104_1$.

Figures 3A, 3B:
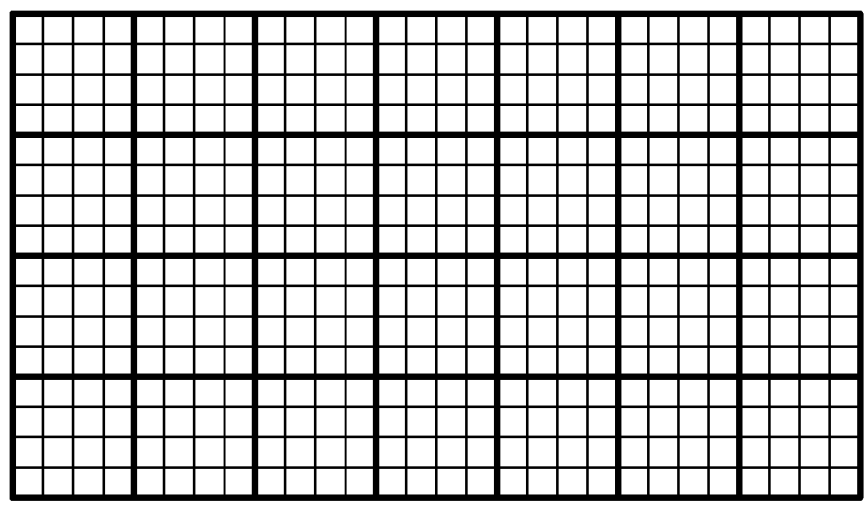
FIG. 3a shows sets of tiles of a rendering space.
FIG. 3b illustrates quantised cost indications for the sets of tiles of the rendering space.

An example is now described with reference to FIGS. 3a and 3b. FIG. 3a shows a rendering space 302 which has 896×512 pixels. Each tile is a 32×32 block of pixels, such that the rendering space 302 has 28 columns and 16 rows of tiles as shown in FIG. 3a. The tiles are grouped together into 4×4 blocks as shown by the bold lines in FIG. 3a, wherein each 4×4 block of tiles is considered to be a set of tiles for which a cost indication is to be determined. In this example, the cost indication logic 110 obtains cost indications for each of the tiles in the rendering space, either by determining the cost indications or by receiving the cost indications via an API as described above. A cost indication is then determined for each of the 4×4 sets of tiles based on the cost indications of the tiles within the respective sets. To give some examples, the cost indication logic may determine the cost indication for a set of tiles by determining: (i) an average of the cost indications of the tiles within that set, (ii) a sum of the cost indications of the tiles within that set, (iii) a maximum of the cost indications of the tiles within that set, or (iv) a number of the tiles within that set which have cost indications above a threshold. In other examples, the cost indications of tiles within a set may be combined in other ways to determine a cost indication for the set as a whole. Furthermore, in some examples, a cost indication is determined for a set of tiles without first determining individual cost estimates for the individual tiles within the set.

FIG. 3b shows quantised cost indications for the 4×4 sets of tiles shown in FIG. 3a. In this example, cost indications are determined for each of the tiles and then the cost indication for a 4×4 set of tiles is determined by combining the cost indications for the individual tiles within that set of tiles (e.g. by finding the sum of the individual cost indications) and then quantising the cost indications down to a 1-bit value. In this simple example of 1-bit cost indications, each cost indication is either 0 or 1. It can be seen that there is a region near the bottom right of the rendering space 302 which is relatively costly to render, e.g. because the graphics content in this region is particularly detailed (e.g. a high number of primitives in this region, which may involve translucent or punch through primitives) or the effects used to render this region require complex shader programs. To give some examples, regions of foliage, smoke or fire (particle systems) in a scene can be costly to render. In contrast the top left region of the rendering space 302 is not so costly to render, e.g. because the graphics data in this region is simple, e.g. this region may represent a plain background with little detail in the scene.

In the rendering phase the rendering logic 108 receives the control streams for the tiles of the rendering space for a current render. The control logic 118 receives the cost indications from the control streams. In step S210 the control logic 118 analyses the cost indications for the tiles and determines rendering complexities for the tiles in dependence on the cost indications. For example, the rendering complexity for a particular set of one or more tiles may be controlled in dependence on the respective cost indication for the particular set of one or more tiles.

In step S212 the rendering logic 108 renders primitives in the tiles of the rendering space according to the determined rendering complexities. Steps S210 and S212 may be performed concurrently such that rendering complexities are determined for sets of tiles as the rendering logic 108 renders other sets of tiles for which rendering complexities have previously been determined. The rendering logic 108 uses the control stream for a tile to identify which primitives are present in the tile, and fetches the data relevant to those primitives from the memory $104_1$, such that the primitives in the tile can be rendered.

Figure 4A:
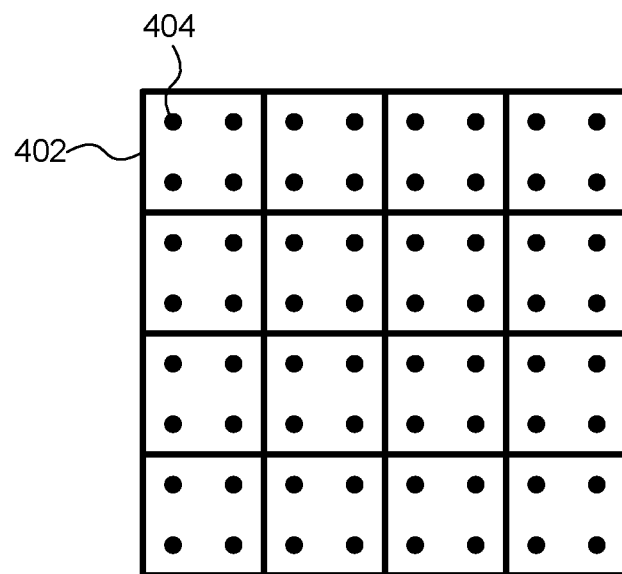
FIG. 4a illustrates sample positions within pixels at a rendering complexity of four samples per pixel.
Figure 4B:
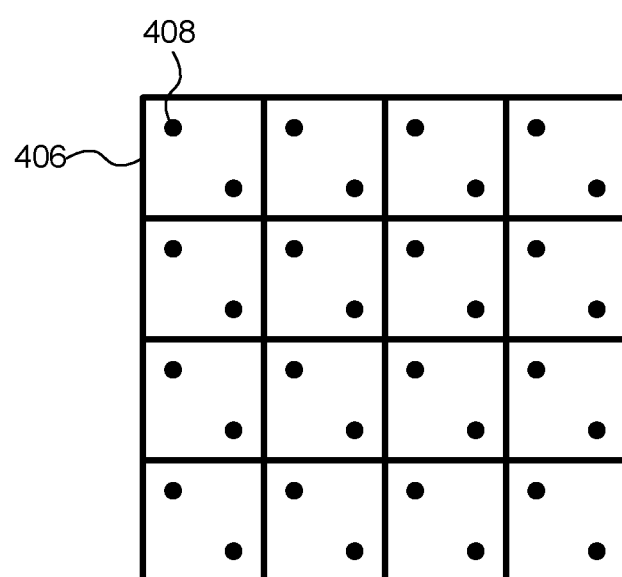
FIG. 4b illustrates sample positions within pixels at a rendering complexity of two samples per pixel.

The manner in which the rendering complexity is controlled for the rendering of a tile may be different in different examples. For example, the rendering complexity may relate to a number of samples per pixel that are rendered, such that the rendering complexity can be controlled by controlling the number of samples per pixel that are rendered for a tile. The rendering logic 108 processes primitive data at the sample positions within the rendering space. In a ray tracing renderer, a primary ray may be traced through each sample position. A low complexity rendering may include a single sample per pixel such that the rendered value at a sample position provides a pixel value of a rendered image. A more complex rendering may include multiple samples per pixel, wherein the pixel values may be determined by combining rendered values from relevant sample positions. Using multiple samples per pixel may for example be useful for antialiasing of pixel values, since a combination (e.g. an average) of multiple rendered sample values can be used to determine a rendered pixel value. Increasing the number of samples per pixel that are processed by the rendering logic 108 may increase the quality of a rendered image, but it will increase the amount of processing (and therefore the rendering time and processing power consumption) involved in rendering an image. FIG. 4a shows an example in which sixteen pixels are represented (one of which is denoted 402), wherein for each pixel four samples are processed (one of which is denoted 404). FIG. 4b shows another example, which corresponds to a lower rendering complexity than the example shown in FIG. 4a, in which sixteen pixels are represented (one of which is denoted 406), wherein for each pixel there are two samples (one of which is denoted 408). In other examples, a different number of samples per pixel may be implemented. Furthermore, in other examples, the sample positions may be arranged in different patterns to those shown in FIGS. 4a and 4b.

A number of samples per pixel described herein may refer to an average number of samples per pixel over some portion of the image, e.g. over the whole image or over a tile or over a group of tiles. It is, however, noted that the number of samples per pixel may vary within a tile (e.g. a higher number of samples per pixel may be used for pixels containing primitive edges compared to the number of samples per pixel used for pixels in the centre of a primitive). In some examples, the rendering complexity may be reduced even below one sample per pixel (on average). As described above, reducing the number of samples that are processed in a tile will reduce the amount of processing (and therefore the rendering time and processing power consumption) involved in rendering that tile. This may be useful, for example if rows of tiles are rendered and then passed directly for display in a raster scan order in real-time, and wherein a timing constraint on the rendering of a row of tiles is such that if the tiles are rendered at one sample per pixel the tiles would not be rendered in time to be displayed without significant latency. In this case, rendering at lower than one sample per pixel can help to meet the timing constraint such that tiles can be displayed in real-time without significant latency, and this advantage may be considered to outweigh a disadvantage of lower image quality due to the reduced number of samples per pixel that are rendered. For example, the total number of samples within a tile that are processed in the GPU 102 may be reduced to lower than the number of pixels present within the tile by randomly (or some other pattern) not sampling some pixels within the tile. In this way for some pixels in the tile, a sample may be processed in the GPU 102, but for other pixels in the tile (referred to as "dropped pixels" or "unrendered pixels") a sample is not processed in the GPU 102. It may be preferable that the dropped pixels are evenly distributed across the tile, so a regular pattern of dropped pixels may be used or some other pattern which is not biased towards dropping particular pixels may be used. Therefore, the GPU 102 is configured to select the dropped pixels to be evenly spatially-distributed. A regular pattern for dropped pixels may introduce unwanted artefacts in the rendered image, so it may be beneficial to choose which pixels to drop randomly (where "random" includes "pseudo-random"). If a regular pattern for the dropped pixels was used, it may be possible to compensate for the unwanted artefacts, e.g. by changing the Level of Detail (LOD) calculations in a mip-mapped texturing process so that a texture at a resolution (i.e. at a mip map level) that is appropriate to the actual sampling rate is selected to be applied to the pixels.

If pixels have been dropped (i.e. no samples are rendered for the pixels) then the dropped pixel values can be reconstructed at the render output based on nearby rendered (i.e. not dropped) pixels. That is, the values of the unrendered pixels (i.e. the dropped pixels) can be determined by combining nearby rendered pixel values. For example, the value of a dropped pixel can be determined by examining one or more neighbouring pixel values and reconstructing the dropped pixel value according to a reconstruction scheme. For example, a simple filter could be used to determine the dropped pixel values. As another example, an average of adjacent pixel values (e.g. horizontally adjacent and vertically adjacent pixel values) could be used. In a more complicated example, a more complex reconstruction scheme could be used, e.g. a Convolutional Neural Network (CNN) could be used to determine the dropped pixel values based on nearby undropped pixel values in the rendered image.

The reduction in visual quality that results from reducing the sampling rate depends upon the content being rendered. This is because reduced sampling rates tend to detrimentally affect the appearance of edges in a scene (e.g. causing blurring of edges and aliasing which may lead to edges appearing jagged) more than the appearance of flat portions in a scene. Therefore, in step S210 when the sampling rate is chosen for a particular tile, the effect of reducing the sampling rate for rendering the particular tile may be taken into account. For example, if a tile includes many primitive edges then the sampling rate for that tile may be less likely to be reduced than if the tile included fewer primitive edges. For example, the graphics processing unit may determine an edge indication for a tile which provides an indication of the extent to which primitive edges are included in the tile. The number of samples per pixel that are processed for the tile may be controlled in dependence on the determined edge indication for the tile. To give some examples, an edge indication may be determined for a tile by determining the number or length of primitive edges that are present within a particular tile, or by determining the number of vertices that are present in the tile. It may be simpler to determine the number of vertices that are present in the tile rather than determining the number or length of edges within a tile. The edge indications for the tiles being rendered provide measures of the detrimental effect of reducing the sampling rate for the respective tiles, and these edge indications may be taken into account when controlling the sampling rate for rendering the tiles in step S210. For example, if the edge indication is high for a tile then that tile may be less likely to be rendered with a reduced sampling rate compared to a tile for which the edge indication is low.

Furthermore, the sampling rate (i.e. the number of samples per pixel that are processed) may be different in different parts of the processing performed by the GPU 102. For example, if the sampling rate (number of samples per pixel) is to be reduced in order to meet a rendering constraint (e.g. a timing constraint), then in some examples the GPU 102 could use an unreduced sampling rate in the geometry processing logic 106 and/or in the HSR unit 114 (e.g. these parts of the GPU 102 could use a sampling rate that is stipulated by the application submitting data to be rendered), however the number of samples processed in the texturing/shading unit 116 may be reduced independently such that the cost of rendering is reduced. By maintaining an unreduced sampling rate in the geometry processing logic 106 and in the HSR unit 114, edges of objects in the scene can retain the expected resolution, e.g. because tiling and depth testing is performed at the expected resolution, and as such the visual reduction in quality of the rendered images can be kept small. A large proportion of the rendering cost (e.g. rendering time and power consumption) is due to the texturing and shading operations performed by the texturing/shading unit 116, so by reducing the number of samples which are processed in the texturing/shading unit 116 a significant reduction in rendering cost (e.g. time and/or power) can be achieved. By reducing the sampling rate of the texturing/shading unit 116 independently of the sampling rate in the geometry processing logic 106 and/or HSR unit 114, the visible reduction in quality can be smaller than if the sampling rate was reduced for all of the processing performed in the GPU 102. The geometry processing logic 106 may involve processes which depend upon the positions of the samples within a tile, and are therefore dependent upon the sampling rate. Such processes include small object culling (in which objects which do not overlap with any sample positions in the rendering space are culled prior to tiling) and sample-precision tiling in which primitives are identified in the display list for a tile only if they overlap with at least one sample point within the tile. Furthermore, tessellation performed by the geometry processing logic 106 may be aware of the sampling rate so that tessellation can be performed to a tessellation level at which there is approximately one tessellated primitive per sample.

It may be the case that the control logic 118 increases the rendering complexity for lower cost tiles. This can help to maintain a roughly similar processing cost (e.g. rendering time) for different tiles. In that case, as an example with reference to the examples shown in FIGS. 3a, 3b, 4a and 4b, primitives in the sets of tiles for which the quantised cost indication is 0 (e.g. the top left sets of tiles in FIG. 3b) may rendered with a relatively high rendering complexity (e.g. with four samples per pixel as shown in FIG. 4a); whereas primitives in the sets of tiles for which the quantised cost indication is 1 (e.g. the bottom right sets of tiles in FIG. 3b) may rendered with a relatively low rendering complexity (e.g. with two samples per pixel as shown in FIG. 4b).

However, in other cases, the control logic 118 may increase the rendering complexity for higher cost tiles. This can allow an image quality to be higher in regions with more image detail than in regions with less image detail. This may be beneficial if the images are not being rendered for display in real-time such that image quality is more important than rendering time. In these cases, as an example with reference to the examples shown in FIGS. 3a, 3b, 4a and 4b, primitives in the sets of tiles for which the quantised cost indication is 0 (e.g. the top left sets of tiles in FIG. 3b) may rendered with a relatively low rendering complexity (e.g. with two samples per pixel as shown in FIG. 4b); whereas primitives in the sets of tiles for which the quantised cost indication is 1 (e.g. the bottom right sets of tiles in FIG. 3b) may rendered with a relatively high rendering complexity (e.g. with four samples per pixel as shown in FIG. 4a).

The rendering logic 108 may perform deferred rendering, as indicated in FIG. 1, such that hidden surface removal is performed on primitives (by the HSR unit 114) to remove primitive fragments which are hidden from view by other primitives in the scene, and then texturing and/or shading is applied to the primitive fragments (by the texturing/shading unit 116) after the hidden surface removal has been applied to those primitive fragments. The texturing and/or shading performed on the fragments which pass the HSR stage determines pixel colour values of a rendered image which can be passed to the memory $104_2$ for storage in the frame buffer 120. Texture data may be received at the rendering logic 108 from the memory $104_1$ in order to apply texturing to the primitive fragments. Shader programs may be executed to apply shading to the primitive fragments, thereby adding visual effects to the rendering of the primitive fragment. These shader programs are the shader programs mentioned above that were compiled by the compiler 122 and provided to the rendering logic 108. The texturing/shading process may include applying further processing to the primitive fragments (e.g. alpha blending and other processes), in order to determine rendered pixel values of an image.

The term "fragment" refers to a sample of a primitive at a sampling point, which is to be processed for rendering pixels of an image. In some examples, there may be a one to one mapping of sample positions to pixels. In other examples there may be more sample positions than pixels, and this oversampling can allow for higher quality rendering of pixel values, e.g. by facilitating anti-aliasing and other filtering that may be applied to multiple fragments for rendering each of the pixel values.

In other examples, the processing logic 108 may perform non-deferred rendering such that texturing and/or shading is applied to primitive fragments, and then hidden surface removal is performed on the textured/shaded primitive fragments to remove primitive fragments which are hidden from view by other primitives in the scene. Non-deferred rendering methods may be less efficient than deferred rendering methods because they involve unnecessarily shading and texturing of primitive fragments which are ultimately hidden in the scene.

Both the deferred rendering and non-deferred rendering systems described above implement rasterisation techniques to render primitive data. In other examples, other rendering techniques may be used in the rendering logic, for example a ray tracing technique may be used to render the primitive data. A primary ray may be processed for each sample position. Ray tracing techniques are known in the art and as such the details of implementing a ray tracing rendering technique are not described in detail herein.

In step S214 the rendered image values are output. For example, the rendered image values may be output to the memory $104_2$ and stored in the frame buffer 120. Rendered image values may represent pixels of a rendered image and may be used in any suitable manner. For example, pixels of a rendered image may be displayed on a display or transmitted to another device, e.g. over a network such as the Internet and/or a mobile telephone network. If the render is a sub-render then the result of the render may be for use in a subsequent render, e.g. the result of the sub-render could be a texture, shadow map or environment to be applied in a subsequent render. In this case, the result of the render could be stored (e.g. in memory $104_2$) and subsequently provided back to the rendering logic 108 for use in the subsequent render. Alternatively, the result of the render could be stored on the GPU 102 itself.

The GPU 102 may be configured to satisfy one or more rendering constraints. In some examples the constraints are real-time requirements of the system. The rendering constraint(s) may be satisfied by controlling the rendering complexity with which the rendering logic 108 renders primitives in the sets of tiles in dependence on the cost indications.

A rendering constraint may be a constraint on the timing at which respective portions (e.g. tiles, lines of tiles or other portions) of a rendered image are output from the rendering logic 108. Similarly, a rendering constraint may be a constraint on the timing at which a rendered image is output from the rendering logic 108. The control logic 118 uses the cost indications to determine the likely processing cost (e.g. rendering time) for rendering respective tiles, before those tiles are rendered. Therefore, the control logic 118 can control the rendering complexity based on the information provided by the cost indications such that the rendering of the tiles meets the timing constraints. In these cases the image quality can be sacrificed (by reducing the rendering complexity), for some or all of the tiles of an image, in order to meet the real-time requirements (i.e. the timing constraints).

Figure 5:
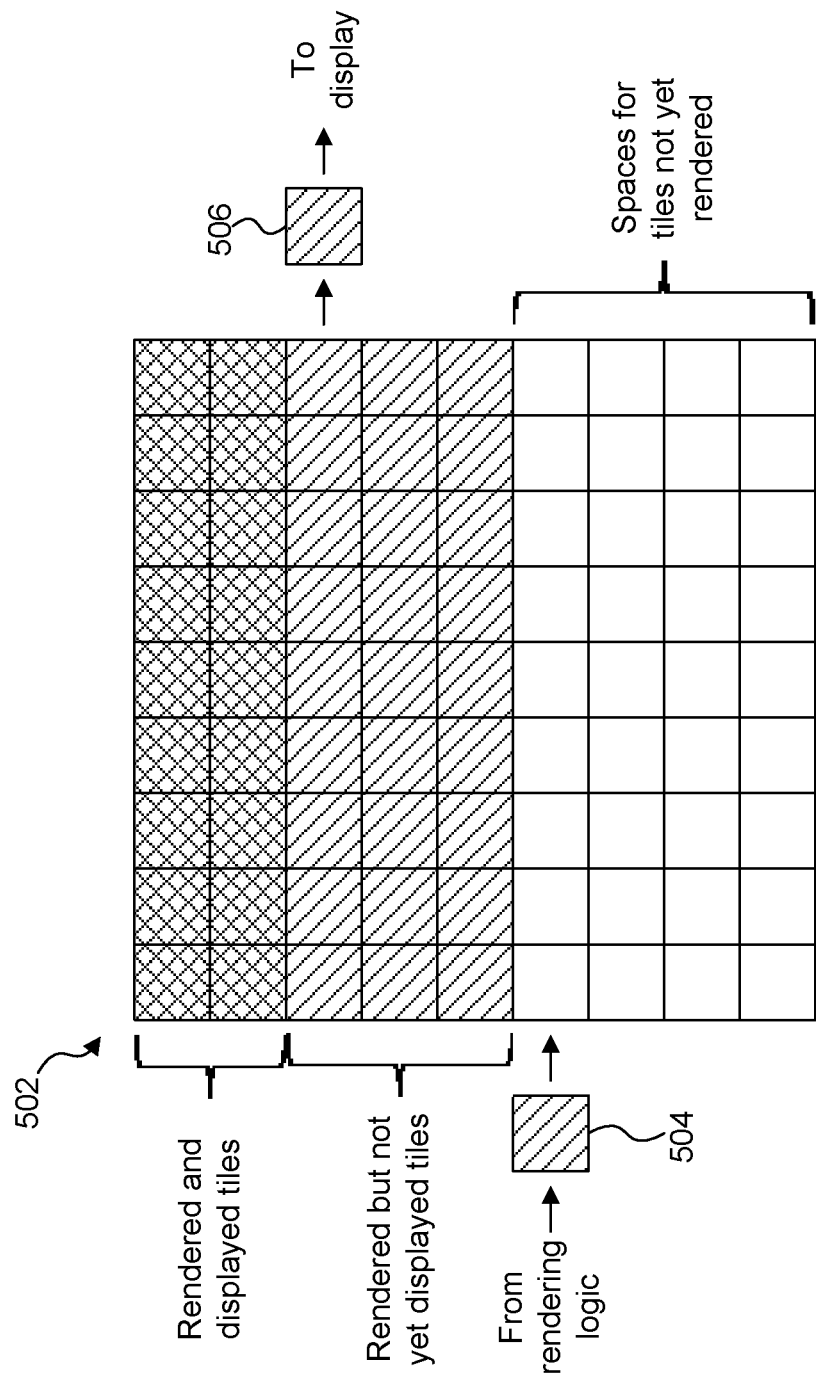
FIG. 5 illustrates rendered tiles within a frame buffer.

For example, the graphics processing system 100 may render images to be output to a display, for display in real-time. A display (e.g. as shown with reference 708 in FIG. 7) is typically arranged to display images at a predetermined frame rate. Many different frames rates may be used in different examples, and common examples include 50 Hz, 60 Hz and 100 Hz to give just some examples. The graphics processing system 100 therefore has a timing constraint to output rendered images to meet the frame rate of the display. In other words, the graphics processing system 100 renders images to satisfy a target frame rate (e.g. corresponding to the frame rate at which the images are displayed in real-time). If the images are not rendered to satisfy the target frame rate then the display of the images may stall. The rendering complexity for rendering tiles of an image can be controlled in dependence on the cost indications for the tiles such that the rendering logic 108 renders images at a rate that satisfies the target frame rate. That is, the cost indications can be used to provide an indication of a likely rendering time for rendering an image at a particular rendering complexity (e.g. when using four samples per pixel). If the likely rendering time satisfies the target frame rate (i.e. if the likely rendering time is less than or equal to the reciprocal of the target frame rate) then the rendering logic 108 renders the image at the particular rendering complexity (e.g. at four samples per pixel); whereas if the likely rendering time does not satisfy the target frame rate (i.e. if the likely rendering time is greater than the reciprocal of the target frame rate) then the rendering logic 108 renders some, or all, of the tiles of the image at a reduced rendering complexity (e.g. at two samples per pixel). In this case, the rendering logic 108 (e.g. the control logic 118) may determine which, if any, of the tiles to render at reduced complexity. For example, tiles with low cost indications may be rendered at lower complexity than tiles with high cost indications. This would mean that the areas of the image with more image detail (which would tend to have higher cost indications) would be rendered with more samples per pixel than areas of the image with less image detail, which may help to preserve the image quality in the most detailed regions of the image, whilst less detailed regions of the image might not need such a high image quality in order to maintain a good perceived quality in the rendered image. In other examples, tiles with high cost indications may be rendered at lower complexity than tiles with low cost indications. This would mean that the areas of the image with more image detail (which would tend to have higher cost indications) would be rendered with fewer samples per pixel than areas of the image with less image detail, which may help to maintain a similar rendering time across different regions of the image, which may be useful if regions of the image need to be rendered at regular intervals (e.g. if lines of tiles are rendered directly ahead of a raster scan of a display).

Where the rendered images are being displayed on a display in raster scan order, lines of tiles (e.g. rows of tiles) may be rendered according to the scan order of the display such that they are ready for display, without needing to wait for a whole image to be rendered before providing any pixel values of the image to the display. In other words, the rendering logic 108 may be configured to render tiles in an order such that lines of tiles are rendered to be output in real-time to a display in a raster scan order. FIG. 5 shows an example of tiles 502 stored in the frame buffer 120. The frame buffer 120 is implemented as a circular buffer, wherein tiles are rendered in a raster scan order (e.g. in rows of tiles) and the pixel values for the rendered tiles are placed into the frame buffer 120 at appropriate positions. Simultaneously, rows of pixel values can be output from the frame buffer 120 to the display to be displayed according to the raster scan of the display. In other words, the frame buffer 120 stores rendered image values which have been rendered by the rendering logic 108, and the frame buffer 120 is configured to output some lines of rendered image values of an image for display in a raster scan order before other lines of rendered image values of the image have been rendered by the rendering logic 108. FIG. 5 shows some of the tiles 502 in the frame buffer 120 with cross-hatching to represent tiles which have been rendered and displayed; FIG. 5 also shows some of the tiles 502 in the frame buffer 120 with diagonal hatching to represent tiles which have been rendered and stored in the frame buffer 120 but not yet displayed; FIG. 5 also shows some spaces in the frame buffer 120 for tiles of the current frame which have not yet been rendered. A tile 504 has been rendered by the rendering logic 108 and is being placed in the appropriate available space in the frame buffer 120. A rendered tile 506 is being outputted to the display for display thereon. In the example shown in FIG. 5 the rendering of tiles is ahead of the scan of the display such that the tiles 504 and 506 relate to the same image. In other examples, the rendering of tiles may be behind the scan of the display such that a tile being rendered is for a higher region of a current image whilst a tile being displayed is for a lower region of the preceding image.

In conventional systems, two frame buffers may be used, and a whole frame may be rendered into a first frame buffer while an image stored in a second frame buffer is output to a display, and then the frame buffers swap so that the next frame may be rendered into the second frame buffer while the image stored in the first frame buffer is output to the display. This adds a frame period of latency into the pipeline because a whole frame is rendered before any of the frame begins to be displayed. In contrast, the use of the (single) frame buffer as shown in FIG. 5 with the rendering of tiles providing lines of rendered tiles in accordance with the raster scan of the display means that the latency is reduced by up to one frame period between the time at which an application sends graphics data to the graphics processing system 100 and the time at which the rendered image is displayed on the display. This reduction in latency can be important for applications, such as game applications, which provide a real-time display to a user with which the user is to interact. Reducing latency is particularly important if the graphics processing system 100 is to be included in a virtual reality (VR) system, e.g. a VR headset. Virtual reality systems aim to give a user the impression of "presence" in a virtual world, and if there is significant latency in the display of images, the user's perception of being present in the virtual world is reduced.

So, the rendering logic 108 may operate in accordance with a timing constraint for rendering a line of tiles, such that each line of tiles can be rendered before needing to be displayed according to the raster scan of the display. The control logic 118 controls the rendering complexity of tiles in dependence on their cost indications such that the rendering logic 108 renders lines of tiles at a rate that satisfies the timing constraint. The cost indications can be used to provide an indication of a likely rendering time for rendering tiles at a particular rendering complexity (e.g. when using four samples per pixel). If the likely rendering time for a line of tiles satisfies the timing constraint for the rendering of that line of tiles then the rendering logic 108 renders the image at the particular rendering complexity (e.g. at four samples per pixel); whereas if the likely rendering time does not satisfy the timing constraint then the rendering logic 108 renders some, or all, of the tiles of the line of tiles at a reduced rendering complexity (e.g. at two samples per pixel). The rendering logic 108 (e.g. the control logic 118) may determine which, if any, of the tiles to render at reduced complexity. For example, tiles with high cost indications may be rendered at lower complexity than tiles with low cost indications. This would help to maintain a similar rendering time across different regions of the image.

Figures 6A, 6B, 6C:
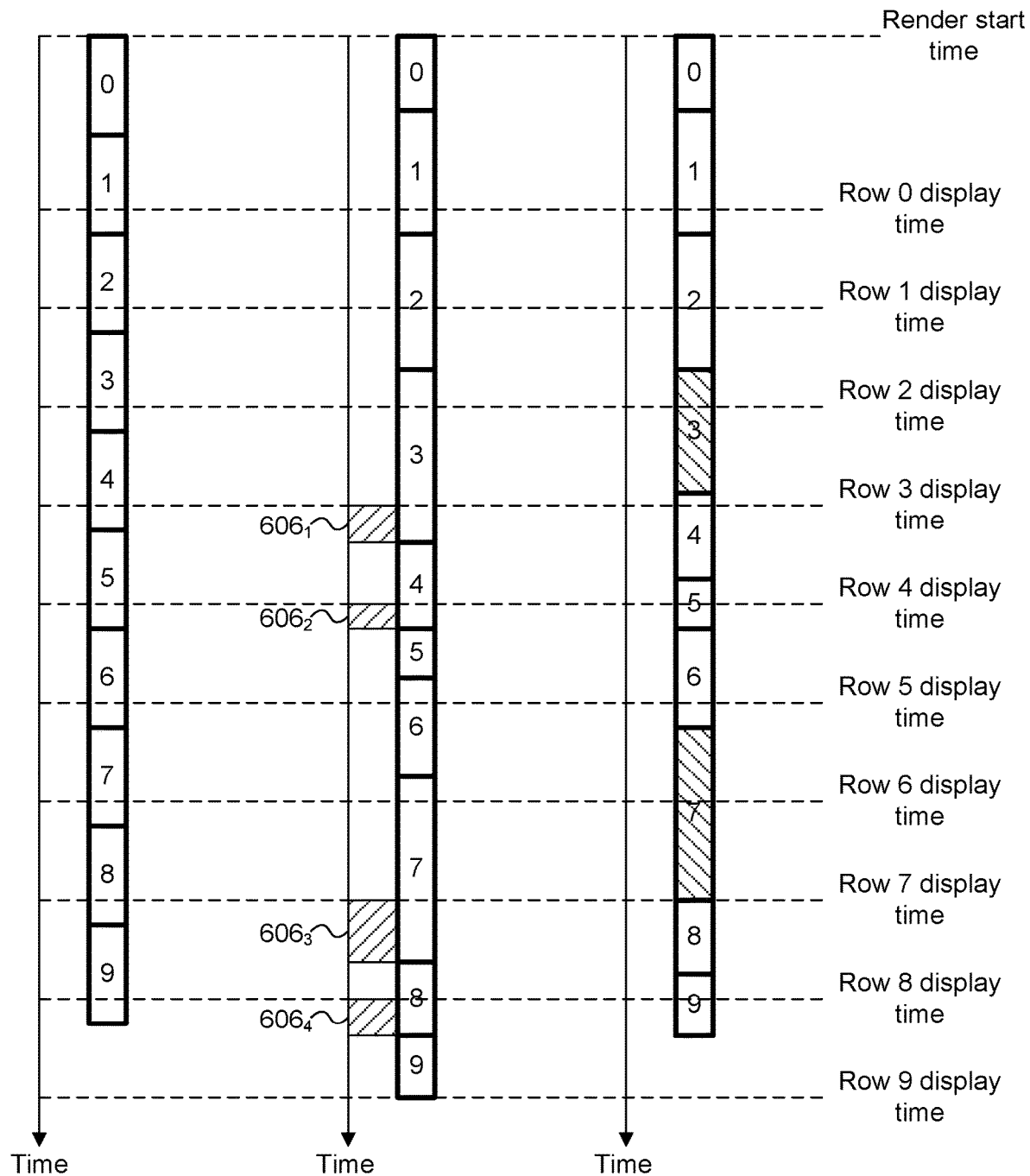
FIG. 6a is a graph illustrating the timing of rendering and display of an idealised tile workload.
FIG. 6b is a graph illustrating the timing of rendering and display of a tile workload with small variations in the rendering time of the tile workloads.
FIG. 6c is a graph illustrating the timing of rendering and display of a tile workload with small variations in the rendering time of the tile workloads, wherein the rendering complexity of some tiles is controlled to meet a timing constraint.

FIGS. 6a to 6c show graphs illustrating the timing of rendering and display of tile workloads in different examples. In particular, FIG. 6a shows an idealised tile workload where each row of tiles takes the same amount of time to render. The blocks labelled 0 to 9 illustrate the times during which the rendering logic 108 is rendering tiles of the particular row. The horizontal dashed lines show the times at which pixels from the respective rows of tiles begin being displayed on a display. In the idealised example shown in FIG. 6a each row of tiles is rendered before the time at which it is due to be displayed on the display, so the tiles can all be rendered at normal rendering complexity (e.g. at four samples per pixel).

However, in more realistic situations, different tiles may take different amounts of time to be rendered. FIG. 6b is a graph illustrating the timing of rendering and display of a tile workload with small variations in the rendering time of the tile workloads. In the example shown in FIG. 6b the rendering complexity is not varied for different tiles, and each tile is rendered at the normal rendering complexity (e.g. at four samples per pixel). It can be seen that rows of tiles 0, 1 and 2 are rendered before the time at which they are to be displayed, but the tiles in row 3 are costly to render and therefore take a long time, such that row 3 is not completely rendered before the time at which pixels from row 3 are to be displayed. Row 4 is also not completely rendered before the time at which pixels from row 4 are to be displayed. Rows 5 and 6 have particularly cheap tiles, such that they are rendered quickly enough to be displayed on time. However, tiles in row 7 take a long time to render and as such rows 7 and 8 are not completely rendered before the times at which pixels from the respective rows 7 and 8 are to be displayed. However, row 9 includes cheap tiles so row 9 is rendered in time to be displayed. The hatched regions $606_1$, $606_2$, $606_3$ and $606_4$ indicate times for which a row of tiles should be being displayed but cannot be because it has not yet been rendered. This can cause problems in the real-time display of rendered images and noticeable errors can appear in the displayed image.

FIG. 6c is a graph illustrating the timing of rendering and display of the same tile workload as shown in FIG. 6b in which there are small variations in the rendering time of the tile workloads. However, in FIG. 6c the rendering complexity of some tiles is controlled based on the cost indications for the tiles in order to meet a timing constraint that the rows of tiles are rendered in time to be displayed at the respective row display times. The cost indications provide an indication of a likely rendering time and the control logic 118 determines that the cost indications for tiles in rows 3 and 7 are high, and therefore reduces the rendering complexity for tiles in these rows (e.g. such that the tiles are rendered with two samples per pixel). The rendering of tiles 3 and 7 is shown with hatching to indicate a reduced rendering complexity. The other rows of tiles are rendered at the normal rendering complexity (e.g. four samples per pixel). It can be seen in FIG. 6c that each row of tiles is rendered in time to meet the target display times for the respective rows.

In another example, a rendering constraint may be a target quality for rendering tiles. The rendering complexity of tiles may be controlled in dependence on the cost indications such that the rendering logic 108 renders the tiles to satisfy the target quality. For example, a high cost tile is likely to have a high level of image detail so it may be useful to render a high cost tile with a high rendering complexity (e.g. using four samples per pixel) in order to meet the target quality for the rendering of the tile; whereas a low cost tile is likely to have a low level of image detail so a low cost tile may be rendered with a lower rendering complexity (e.g. using two samples per pixel) without significantly affecting the quality of the rendered image, such that the target quality may still be satisfied.

In examples described above, the GPU 102 is embodied in a device which further comprises a display, wherein the rendered image values representing pixels of a rendered image are sent to the display for display thereon.

In some examples, the GPU 102 may be embodied in a device which further comprises a transmission unit (e.g. as shown with reference 712 in FIG. 7), wherein the rendered image values representing pixels of a rendered image are provided to the transmission unit for transmission to another device, e.g. to a display for display thereon. The transmission could be over a wired or wireless connection, e.g. over a local network such as a local WiFi network, or over a wider network such as over the Internet or over a telecommunications network.

In some examples, the GPU 102 may be embodied in a device which further comprises a video encoding unit (e.g. as shown with reference 710 in FIG. 7) configured to encode image values which have been rendered by the rendering logic 108. Video encoding can reduce the amount of data used to represent one or more images (e.g. a sequence of images), and as such could be particularly useful if the encoded image was then transmitted over a network (since the bandwidth used would be reduced) or if the encoded image was then stored (since the amount of memory used would be reduced). Video encoding methods are known in the art, which typically conform to a video encoding standard. There are many different video encoding standards, such as the H.265, H.264, VP8, VP9, DivX video standards, and many more. An aim of encoding an image is often to reduce the amount of data that is used to represent the image. Therefore, the encoding of the image may involve some compression of the image. The compression may be lossless or lossy.

In examples described above, the GPU 102 controls the rendering complexity by controlling the number of samples per by pixel that are processed in the rendering logic 108. In some examples, the GPU 102 (e.g. the control logic 118) can control the rendering complexity with which primitives in a tile are rendered by controlling one or more rendering processes that are applied by the rendering logic 108 to primitive fragments at sample positions within the rendering space. For example, the rendering processes may include filtering operations, e.g. texture filtering operations on textures which are applied to primitive fragments by the rendering logic 108. For example, if a low rendering complexity is used for rendering primitives in a tile then simple filtering operations, such as linear filtering, may be used for processing primitive fragments (e.g. a low cost filtering process such as bilinear filtering may be used for texture filtering of textures to be applied to the primitive fragments); whereas if a high rendering complexity is used for rendering primitives in a tile then more complex filtering operations, such as higher order filtering, may be used for processing primitive fragments (e.g. a high cost filtering process such as anisotropic filtering may be used for texture filtering of textures to be applied to the primitive fragments). As another example, the rendering processes may be controlled by controlling shading effects which are applied to primitive fragments in a tile by the texturing/shading unit 116. For example, if a high rendering complexity is used for rendering primitives in a tile then complex shading effects may be applied to primitive fragments by the texturing/shading unit 116; whereas if a low rendering complexity is used for rendering primitives in a tile then relatively simple shading effects may be applied to primitive fragments by the texturing/shading unit 116. For example, primitive data for a primitive may indicate a set of two or more different shader programs which could be used for processing the primitive, and the rendering logic 108 may select between the different shader programs for rendering the primitive based on the rendering complexity with which the primitive is to be rendered. In this case the rendering complexity with which the primitives within a tile are to be rendered may be based on a cost indication which is not solely determined by the complexity of the shader programs.

As another example, the rendering logic 108 might be configured to apply a ray tracing method for rendering primitives, and the rendering processes may be controlled by controlling ray tracing parameters used in the ray tracing method. For example, the number of ray bounces to be processed and/or a clipping distance for rays may be controlled to thereby control the rendering complexity. For example, if a high rendering complexity is used then a large number of ray bounces may be considered and/or a large clipping distance may be set for the rays; whereas if a low rendering complexity is used then a small number of ray bounces may be considered and/or a short clipping distance may be set for the rays.

As another example, the rendering logic 108 may be configured to generate a set of colour values for each sample of the rendered image. The rendering complexity may be controlled by controlling the number of colour values that are determined per sample. For example, at full rendering complexity, the rendering logic may generate a set of colour values for each rendered sample; whilst at a reduced rendering complexity, the rendering logic may generate a subset of the set of colour values for one or more rendered samples. There may be a one-to-one mapping between samples and pixels, but as described above, the number of samples per pixel may be different in different examples, and where there are multiple samples per pixel the rendered samples for a pixel can be combined to determine the rendered pixels of the rendered image. The set of colour values for a sample may for example include a red value, a green value and a blue value (referred to as "RGB" values). For example, a predetermined number of bits (e.g. 8 bits) may be used to represent each of the colour values for a sample. There are many other colour formats which could be used instead of RGB, such as the $YC_bC_r$ colour format. At full rendering complexity each of the colour values of the set of colour values are determined for a sample. However, one approach to reducing the rendering complexity is to not generate one or more of the colour values of the set of colour values for one or more samples. For example, for one or more of the samples (e.g. every sample in a tile for which the rendering complexity is to be reduced), a subset of the full set of colour values is generated. The term "subset" is used here to mean at least one, but not all, of the values in the full "set". For example, a single colour value (e.g. R, G or B) could be generated for each sample. Preferably the subset of colour values would not be the same for every sample. For example, the colour values to be determined for samples within a tile to be rendered at reduced complexity could be determined, according to a pattern whereby different colour values (e.g. R, G or B) are generated for some different ones of the samples. For example, the pattern could match that of a Bayer filter such that for each 2×2 block of samples, one of the samples has (only) a Blue colour value determined, one of the samples has (only) a Red colour value determined and two of the samples have (only) a Green colour value determined. Other patterns may be used in different examples. For example, the pattern may be chosen to match a pattern used in a display which is to display the rendered image. Reducing the number of colour values that are determined for samples can significantly reduce the rendering complexity, and may still provide an acceptable level of quality in the rendered image. Demosaicing techniques could be used to generate missing colour values for pixels after the image has been rendered if this is appropriate.

Figure 7:
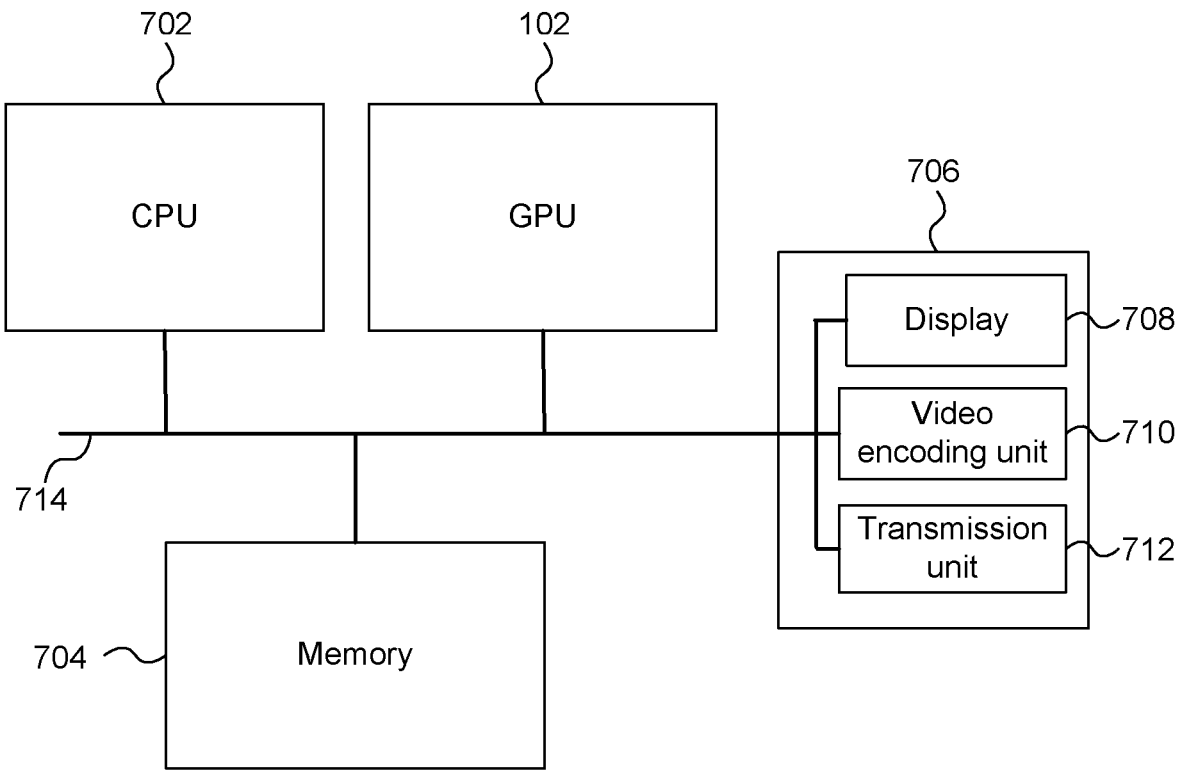
FIG. 7 shows a computer system in which a graphics processing system is implemented.

FIG. 7 shows a wider computer system in which the graphics processing systems described herein may be implemented. The computer system comprises a CPU 702, the GPU 102, a memory 704, and other devices 706, such as a display 708, video encoding unit 710 and transmission unit 712 as described above. The components of the computer system can communicate with each other via a communications bus 714. The memory 704 may include the memories $104_1$ and $104_2$ shown in FIG. 1.

The graphics processing system 100 is shown as comprising a number of functional blocks. This is schematic only and is not intended to define a strict division between different logic elements of such entities. Each functional block may be provided in any suitable manner. It is to be understood that intermediate values described herein as being formed by a graphics processing system need not be physically generated by the graphics processing system at any point and may merely represent logical values which conveniently describe the processing performed by the graphics processing system between its input and output.

The graphics processing units described herein may be embodied in hardware on an integrated circuit. The graphics processing units described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a graphics processing unit configured to perform any of the methods described herein, or to manufacture a graphics processing unit comprising any apparatus described herein. An integrated circuit definition dataset may be, for example, an integrated circuit description.

Therefore, there may be provided a method of manufacturing, at an integrated circuit manufacturing system, a graphics processing unit as described herein. Furthermore, there may be provided an integrated circuit definition dataset that, when processed in an integrated circuit manufacturing system, causes the method of manufacturing a graphics processing unit to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics processing unit will now be described with respect to FIG. 8.

Figure 8:
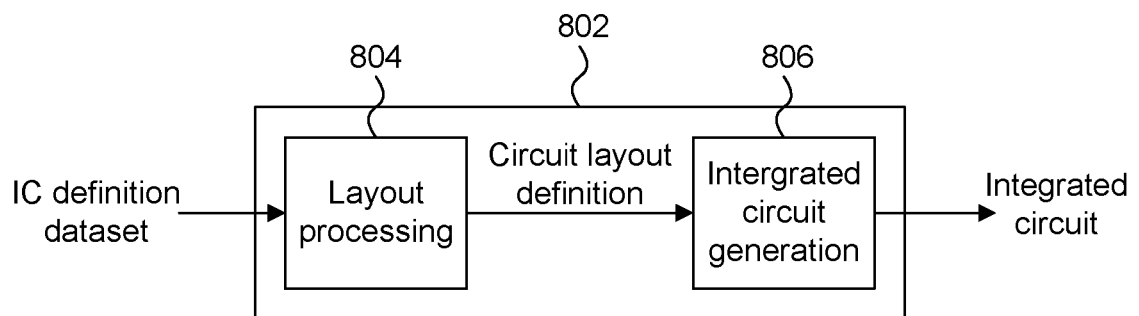
FIG. 8 shows an integrated circuit manufacturing system for generating an integrated circuit embodying a graphics processing unit.

FIG. 8 shows an example of an integrated circuit (IC) manufacturing system 802 which comprises a layout processing system 804 and an integrated circuit generation system 806. The IC manufacturing system 802 is configured to receive an IC definition dataset (e.g. defining a graphics processing unit as described in any of the examples herein), process the IC definition dataset, and generate an IC according to the IC definition dataset (e.g. which embodies a graphics processing unit as described in any of the examples herein). The processing of the IC definition dataset configures the IC manufacturing system 802 to manufacture an integrated circuit embodying a graphics processing unit as described in any of the examples herein.

The layout processing system 804 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 804 has determined the circuit layout it may output a circuit layout definition to the IC generation system 806. A circuit layout definition may be, for example, a circuit layout description.

The IC generation system 806 generates an IC according to the circuit layout definition, as is known in the art. For example, the IC generation system 806 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 806 may be in the form of computer-readable code which the IC generation system 806 can use to form a suitable mask for use in generating an IC.

The different processes performed by the IC manufacturing system 802 may be implemented all in one location, e.g. by one party. Alternatively, the IC manufacturing system 802 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 8 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 8, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but is using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A graphics processing unit configured to process graphics data using a rendering space which is sub-divided into a plurality of tiles, the graphics processing unit comprising:
   cost indication logic configured to obtain a cost indication for each of a plurality of sets of one or more tiles of the rendering space, wherein the cost indication for a set of one or more tiles is suggestive of a cost of rendering the set of one or more tiles; and
   rendering logic configured to render primitives in the tiles of the rendering space;
   wherein the graphics processing unit is configured to control a rendering complexity with which the rendering logic renders primitives in the sets of one or more tiles in dependence on the cost indications for the sets of one or more tiles.

2. The graphics processing unit of claim 1 further comprising geometry processing logic, wherein the cost indication logic is implemented as part of the geometry processing logic, and wherein the geometry processing logic further comprises a tiling unit configured to determine, for the tiles of the rendering space, which primitives are present in the tiles.

3. The graphics processing unit of claim 2 wherein the tiling unit is configured to generate control streams for the tiles of the rendering space indicating which primitives are present in the tiles, wherein the rendering logic is configured to identify which primitives are present in a tile using the control stream for the tile, and wherein the tiling unit is configured to include the cost indications in the control streams for the tiles.

4. The graphics processing unit of claim 1 wherein the graphics processing unit is configured to control the rendering complexity by controlling, in dependence on the cost indications for the sets of one or more tiles, a number of samples per pixel that are processed by the rendering logic.

5. The graphics processing unit of claim 4 wherein the graphics processing unit is configured to determine an edge indication for a tile which provides an indication of the extent to which primitive edges are included in the tile, and wherein the graphics processing unit is configured to control the number of samples per pixel that are processed for the tile in dependence on the determined edge indication for the tile.

6. The graphics processing unit of claim 4 wherein the rendering logic is configured such that if the number of samples per pixel is controlled to be fewer than one sample per pixel then for some pixels a sample is not rendered, and wherein the graphics processing unit is configured to determine values for the unrendered pixels by combining nearby rendered pixel values.

7. The graphics processing unit of claim 6 wherein the graphics processing unit is configured to select the unrendered pixels to be evenly spatially-distributed.

8. The graphics processing unit of claim 1 wherein the rendering logic comprises a hidden surface removal unit and a texturing/shading unit, and wherein the graphics processing unit is configured to control the rendering complexity by controlling a number of samples per pixel that are processed by the hidden surface removal unit and independently controlling a number of samples per pixel that are processed by the texturing/shading unit.

9. The graphics processing unit of claim 1 wherein the graphics processing unit is configured to control the rendering complexity by controlling one or more rendering processes that are applied by the rendering logic to primitive fragments at sample positions within the rendering space, wherein said controlling rendering processes comprises one or more of:
- controlling filtering operations used for processing primitive fragments;
- controlling ray tracing parameters including one or more of a number of ray bounces to be processed and a clipping distance for rays, when the rendering logic is configured to apply a ray tracing technique; and
- controlling shading effects which are applied to primitive fragments.

10. The graphics processing unit of claim 1 wherein the graphics processing unit is configured to control the rendering complexity by controlling the number of colour values that are determined per sample, and wherein:
- at full rendering complexity, the rendering logic is configured to generate a set of colour values for each rendered sample, and
- at a reduced rendering complexity, the rendering logic is configured to generate a subset of the set of colour values for one or more rendered samples.

11. The graphics processing unit of claim 1 wherein the graphics processing unit is configured to control the rendering complexity with which the rendering logic renders primitives in the sets of one or more tiles in dependence on the cost indications for the sets of one or more tiles in order to satisfy one or more rendering constraints.

12. The graphics processing unit of claim 11 wherein the one or more rendering constraints include one or more of:
- a constraint on the timing at which respective portions of a rendered image are output from the rendering logic; and
- a constraint on the timing at which a rendered image is output from the rendering logic.

13. The graphics processing unit of claim 11 wherein the one or more rendering constraints include a target frame rate at which images are rendered by the rendering logic, and wherein the graphics processing unit is configured to control the rendering complexity in dependence on the cost indications such that the rendering logic renders images at a rate that satisfies the target frame rate.

14. The graphics processing unit of claim 11 wherein the one or more rendering constraints include a timing constraint for rendering a line of tiles at the rendering logic, and wherein the graphics processing unit is configured to control the rendering complexity in dependence on the cost indications such that the rendering logic renders lines of tiles at a rate that satisfies the timing constraint.

15. The graphics processing unit of claim 11 wherein the one or more rendering constraints include a target quality for rendering tiles at the rendering logic, and wherein the graphics processing unit is configured to control the rendering complexity in dependence on the cost indications such that the rendering logic renders tiles to satisfy the target quality.

16. The graphics processing unit of claim 1 wherein the rendering logic is configured to render tiles in an order such that lines of tiles are rendered to be output in real-time to a display in a raster scan order.

17. The graphics processing unit of claim 16 wherein the graphics processing unit comprises a frame buffer configured to store rendered image values which have been rendered by the rendering logic, wherein the frame buffer is configured to output some lines of rendered image values of an image for display in a raster scan order before other lines of rendered image values of the image have been rendered by the rendering logic.

18. The graphics processing unit of claim 1 wherein the graphics processing unit is embodied in a device which further comprises a video encoding unit configured to encode rendered image values rendered by the rendering logic.

19. A method of processing graphics data in a graphics processing system using a rendering space which is sub-divided into a plurality of tiles, the method comprising:
- obtaining a cost indication for each of a plurality of sets of one or more tiles of the rendering space, wherein the cost indication for a set of one or more tiles is suggestive of a cost of rendering the set of one or more tiles;
- rendering primitives in the tiles of the rendering space; and
- controlling a rendering complexity with which the primitives in the sets of one or more tiles are rendered in dependence on the cost indications for the sets of one or more tiles.

20. A non-transitory computer readable storage medium having stored thereon a computer readable description of an integrated circuit that, when processed in an integrated circuit manufacturing system, causes the integrated circuit manufacturing system to manufacture a graphics processing unit which is configured to process graphics data using a rendering space which is sub-divided into a plurality of tiles, wherein the graphics processing unit comprises:
- cost indication logic configured to obtain a cost indication for each of a plurality of sets of one or more tiles of the rendering space, wherein the cost indication for a set of one or more tiles is suggestive of a cost of rendering the set of one or more tiles; and
- rendering logic configured to render primitives in the tiles of the rendering space;
- wherein the graphics processing unit is configured to control a rendering complexity with which the rendering logic renders primitives in the sets of one or more tiles in dependence on the cost indications for the sets of one or more tiles.

* * * * *